United States Patent
DeJohn et al.

(10) Patent No.: US 9,007,404 B2
(45) Date of Patent: Apr. 14, 2015

(54) TILT-BASED LOOK AROUND EFFECT IMAGE ENHANCEMENT METHOD

(71) Applicant: Legend3D, Inc., San Diego, CA (US)

(72) Inventors: Matt DeJohn, San Diego, CA (US); Jared Sandrew, San Diego, CA (US); Thomas Schad, San Diego, CA (US); Scott Jones, San Diego, CA (US)

(73) Assignee: Legend3D, Inc., Carlsbad, CA (US)

( * ) Notice: Subject to any disclaimer, the term of this patent is extended or adjusted under 35 U.S.C. 154(b) by 186 days.

(21) Appl. No.: 13/843,527

(22) Filed: Mar. 15, 2013

(65) Prior Publication Data

US 2014/0267235 A1    Sep. 18, 2014

(51) Int. Cl.
| | | |
|---|---|---|
| *G09G 5/00* | (2006.01) | |
| *G09G 3/20* | (2006.01) | |
| *G06T 15/00* | (2011.01) | |
| *H04N 13/02* | (2006.01) | |
| *G06F 3/01* | (2006.01) | |
| *H04N 13/00* | (2006.01) | |

(52) U.S. Cl.
CPC .............. *H04N 13/0278* (2013.01); *G06F 3/01* (2013.01); *H04N 13/0022* (2013.01)

(58) Field of Classification Search
USPC ......................................................... 345/659
See application file for complete search history.

(56) References Cited

U.S. PATENT DOCUMENTS

| | | |
|---|---|---|
| 2,593,925 A | 4/1952 | Sheldon |
| 2,799,722 A | 7/1957 | Neugebauer |
| 2,804,500 A | 8/1957 | Giacoletto |
| 2,874,212 A | 2/1959 | Bechley |
| 2,883,763 A | 4/1959 | Schaper |
| 2,974,190 A | 3/1961 | Fine et al. |
| 3,005,042 A | 10/1961 | Horsley |
| 3,258,528 A | 6/1966 | Oppenheimer |
| 3,486,242 A | 12/1969 | Aronson |

(Continued)

FOREIGN PATENT DOCUMENTS

| | | |
|---|---|---|
| DE | 003444353 | 12/1986 |
| EP | 0302454 | 8/1989 |

(Continued)

OTHER PUBLICATIONS

European Office Action dated Jun. 26, 2013, received for EP Appl. No. 02734203.9 on Jul. 22, 2013, 5 pages.

(Continued)

*Primary Examiner* — Charles V Hicks
(74) *Attorney, Agent, or Firm* — ARC IP Law, PC; Joseph J. Mayo

(57) ABSTRACT

A tilt-based look around effect image enhancement method that enables two-dimensional images to be depth enhanced and displayed for example from a different point of view based on the tilt or orientation, and/or movement of the viewing device itself. Embodiments may further alter or otherwise utilize different parallax maps to apply depth to the image based on the display type, e.g., two-dimensional or stereoscopic display, and may dynamically utilize both algorithms on a display capable of both types of display. In addition, embodiments may display information foreign to the image when portions of the image are exposed during the look around effect, including advertisements, game information, hyperlinks or any other data not originally in the image.

22 Claims, 6 Drawing Sheets

(4 of 6 Drawing Sheet(s) Filed in Color)

(56) References Cited

U.S. PATENT DOCUMENTS

| | | |
|---|---|---|
| 3,551,589 A | 12/1970 | Moskoviz |
| 3,558,811 A | 1/1971 | Montevecchio et al. |
| 3,560,644 A | 2/1971 | Petrocelli et al. |
| 3,595,987 A | 7/1971 | Vlahos |
| 3,603,962 A | 9/1971 | Lechner |
| 3,612,755 A | 10/1971 | Tadlock |
| 3,617,626 A | 11/1971 | Bluth et la. |
| 3,619,051 A | 11/1971 | Wright |
| 3,621,127 A | 11/1971 | Hope |
| 3,657,942 A | 4/1972 | Sullivan |
| 3,673,317 A | 6/1972 | Newell |
| 3,705,762 A | 12/1972 | Ladd et al. |
| 3,706,841 A | 12/1972 | Novak |
| 3,710,011 A | 1/1973 | Altemus et al. |
| 3,731,995 A | 5/1973 | Reiffel |
| 3,737,567 A | 6/1973 | Kratomi |
| 3,742,125 A | 6/1973 | Siegel |
| 3,761,607 A | 9/1973 | Hanseman |
| 3,769,458 A | 10/1973 | Driskell |
| 3,770,884 A | 11/1973 | Curran et al. |
| 3,770,885 A | 11/1973 | Curran et al. |
| 3,772,465 A | 11/1973 | Vlahos et al. |
| 3,784,736 A | 1/1974 | Novak |
| 3,848,856 A | 11/1974 | Reeber et al. |
| 3,851,955 A | 12/1974 | Kent et al. |
| 3,971,068 A | 7/1976 | Gerhardt et al. |
| 3,972,067 A | 7/1976 | Peters |
| 4,017,166 A | 4/1977 | Kent et al. |
| 4,021,841 A | 5/1977 | Weinger |
| 4,021,846 A | 5/1977 | Roese |
| 4,054,904 A | 10/1977 | Saitoh et al. |
| 4,149,185 A | 4/1979 | Weinger |
| 4,168,885 A | 9/1979 | Kent et al. |
| 4,183,046 A | 1/1980 | Daike et al. |
| 4,183,633 A | 1/1980 | Kent et al. |
| 4,189,743 A | 2/1980 | Schure et al. |
| 4,189,744 A | 2/1980 | Stern |
| 4,235,503 A | 11/1980 | Condon |
| 4,258,385 A | 3/1981 | Greenberg et al. |
| 4,318,121 A | 3/1982 | Taite et al. |
| 4,329,710 A | 5/1982 | Taylor |
| 4,334,240 A | 6/1982 | Franklin |
| 4,436,369 A | 3/1984 | Bukowski |
| 4,475,104 A | 10/1984 | Shen |
| 4,544,247 A | 10/1985 | Ohno |
| 4,549,172 A | 10/1985 | Welk |
| 4,558,359 A | 12/1985 | Kuperman et al. |
| 4,563,703 A | 1/1986 | Taylor |
| 4,590,511 A | 5/1986 | Bocchi et al. |
| 4,600,919 A | 7/1986 | Stern |
| 4,603,952 A | 8/1986 | Sybenga |
| 4,606,625 A | 8/1986 | Geshwind |
| 4,608,596 A | 8/1986 | Williams et al. |
| 4,617,592 A | 10/1986 | MacDonald |
| 4,642,676 A | 2/1987 | Weinger |
| 4,645,459 A | 2/1987 | Graf et al. |
| 4,647,965 A | 3/1987 | Imsand |
| 4,694,329 A | 9/1987 | Belmares-Sarabia et al. |
| 4,697,178 A | 9/1987 | Heckel |
| 4,700,181 A | 10/1987 | Maine et al. |
| 4,721,951 A | 1/1988 | Holler |
| 4,723,159 A | 2/1988 | Imsand |
| 4,725,879 A | 2/1988 | Eide et al. |
| 4,755,870 A | 7/1988 | Markle et al. |
| 4,758,908 A | 7/1988 | James |
| 4,760,390 A | 7/1988 | Maine et al. |
| 4,774,583 A | 9/1988 | Kellar et al. |
| 4,794,382 A | 12/1988 | Lai et al. |
| 4,809,065 A | 2/1989 | Harris et al. |
| 4,827,255 A | 5/1989 | Ishii |
| 4,847,689 A | 7/1989 | Yamamoto et al. |
| 4,862,256 A | 8/1989 | Markle et al. |
| 4,888,713 A | 12/1989 | Falk |
| 4,903,131 A | 2/1990 | Lingemann et al. |
| 4,918,624 A | 4/1990 | Moore et al. |
| 4,925,294 A | 5/1990 | Geshwind et al. |
| 4,933,670 A | 6/1990 | Wislocki |
| 4,952,051 A | 8/1990 | Lovell et al. |
| 4,965,844 A | 10/1990 | Oka et al. |
| 4,984,072 A | 1/1991 | Sandrew |
| 5,002,387 A | 3/1991 | Baljet et al. |
| 5,038,161 A | 8/1991 | Ki |
| 5,050,984 A | 9/1991 | Geshwind |
| 5,055,939 A | 10/1991 | Karamon et al. |
| 5,093,717 A | 3/1992 | Sandrew |
| 5,177,474 A | 1/1993 | Kadota |
| 5,181,181 A | 1/1993 | Glynn |
| 5,185,852 A | 2/1993 | Mayer |
| 5,237,647 A | 8/1993 | Roberts et al. |
| 5,243,460 A | 9/1993 | Kornberg |
| 5,252,953 A | 10/1993 | Sandrew |
| 5,262,856 A | 11/1993 | Lippman et al. |
| 5,328,073 A | 7/1994 | Blanding et al. |
| 5,341,462 A | 8/1994 | Obata |
| 5,347,620 A | 9/1994 | Zimmer |
| 5,363,476 A | 11/1994 | Kurashige et al. |
| 5,402,191 A | 3/1995 | Dean et al. |
| 5,428,721 A | 6/1995 | Sato et al. |
| 5,481,321 A | 1/1996 | Lipton |
| 5,495,576 A | 2/1996 | Ritchey |
| 5,528,655 A | 6/1996 | Umetani et al. |
| 5,534,915 A | 7/1996 | Sandrew |
| 5,668,605 A | 9/1997 | Nachshon et al. |
| 5,673,081 A | 9/1997 | Yamashita et al. |
| 5,682,437 A | 10/1997 | Okino et al. |
| 5,684,715 A | 11/1997 | Palmer |
| 5,699,443 A | 12/1997 | Murata et al. |
| 5,699,444 A | 12/1997 | Palm |
| 5,717,454 A | 2/1998 | Adolphi et al. |
| 5,729,471 A | 3/1998 | Jain et al. |
| 5,734,915 A | 3/1998 | Roewer |
| 5,739,844 A | 4/1998 | Kuwano et al. |
| 5,742,291 A | 4/1998 | Palm |
| 5,748,199 A | 5/1998 | Palm |
| 5,767,923 A | 6/1998 | Coleman |
| 5,777,666 A | 7/1998 | Tanase et al. |
| 5,778,108 A | 7/1998 | Coleman |
| 5,784,175 A | 7/1998 | Lee |
| 5,784,176 A | 7/1998 | Narita |
| 5,808,664 A | 9/1998 | Yamashita et al. |
| 5,825,997 A | 10/1998 | Yamada et al. |
| 5,835,163 A | 11/1998 | Liou et al. |
| 5,841,512 A | 11/1998 | Goodhill |
| 5,867,169 A | 2/1999 | Prater |
| 5,880,788 A | 3/1999 | Bregler |
| 5,899,861 A | 5/1999 | Friemel et al. |
| 5,907,364 A | 5/1999 | Furuhata et al. |
| 5,912,994 A | 6/1999 | Norton et al. |
| 5,920,360 A | 7/1999 | Coleman |
| 5,929,859 A | 7/1999 | Meijers |
| 5,940,528 A | 8/1999 | Tanaka et al. |
| 5,959,697 A | 9/1999 | Coleman |
| 5,973,700 A | 10/1999 | Taylor et al. |
| 5,973,831 A | 10/1999 | Kleinberger et al. |
| 5,982,350 A | 11/1999 | Hekmatpour et al. |
| 5,990,900 A | 11/1999 | Seago |
| 5,990,903 A | 11/1999 | Donovan |
| 6,005,582 A | 12/1999 | Gabriel et al. |
| 6,011,581 A | 1/2000 | Swift et al. |
| 6,014,473 A | 1/2000 | Hossack et al. |
| 6,023,276 A | 2/2000 | Kawai et al. |
| 6,025,882 A | 2/2000 | Geshwind |
| 6,031,564 A | 2/2000 | Ma et al. |
| 6,049,628 A | 4/2000 | Chen et al. |
| 6,056,691 A | 5/2000 | Urbano et al. |
| 6,067,125 A | 5/2000 | May |
| 6,086,537 A | 7/2000 | Urbano et al. |
| 6,088,006 A | 7/2000 | Tabata |
| 6,091,421 A | 7/2000 | Terrasson |
| 6,102,865 A | 8/2000 | Hossack et al. |
| 6,108,005 A | 8/2000 | Starks et al. |
| 6,118,584 A | 9/2000 | Van Berkel et al. |
| 6,119,123 A | 9/2000 | Dimitrova et al. |
| 6,132,376 A | 10/2000 | Hossack et al. |

(56) References Cited

U.S. PATENT DOCUMENTS

| | | | |
|---|---|---|---|
| 6,141,433 A | 10/2000 | Moed et al. | |
| 6,157,747 A * | 12/2000 | Szeliski et al. | 382/284 |
| 6,166,744 A | 12/2000 | Jaszlics et al. | |
| 6,173,328 B1 | 1/2001 | Sato | |
| 6,184,937 B1 | 2/2001 | Williams et al. | |
| 6,198,484 B1 | 3/2001 | Kameyama | |
| 6,201,900 B1 | 3/2001 | Hossack et al. | |
| 6,208,348 B1 | 3/2001 | Kaye | |
| 6,211,941 B1 | 4/2001 | Erland | |
| 6,215,516 B1 | 4/2001 | Ma et al. | |
| 6,222,948 B1 | 4/2001 | Hossack et al. | |
| 6,226,015 B1 | 5/2001 | Danneels et al. | |
| 6,228,030 B1 | 5/2001 | Urbano et al. | |
| 6,263,101 B1 | 7/2001 | Klein | |
| 6,271,859 B1 | 8/2001 | Asente | |
| 6,314,211 B1 | 11/2001 | Kim et al. | |
| 6,329,963 B1 * | 12/2001 | Chiabrera et al. | 345/6 |
| 6,337,709 B1 | 1/2002 | Yamaashi et al. | |
| 6,360,027 B1 | 3/2002 | Hossack et al. | |
| 6,364,835 B1 | 4/2002 | Hossack et al. | |
| 6,373,970 B1 | 4/2002 | Dong et al. | |
| 6,390,980 B1 | 5/2002 | Peterson et al. | |
| 6,405,366 B1 | 6/2002 | Lorenz et al. | |
| 6,414,678 B1 | 7/2002 | Goddard et al. | |
| 6,416,477 B1 | 7/2002 | Jago | |
| 6,429,867 B1 | 8/2002 | Deering | |
| 6,445,816 B1 | 9/2002 | Pettigrew | |
| 6,456,340 B1 | 9/2002 | Margulis | |
| 6,466,205 B2 | 10/2002 | Simpson et al. | |
| 6,477,267 B1 | 11/2002 | Richards | |
| 6,492,986 B1 | 12/2002 | Metaxas et al. | |
| 6,496,598 B1 | 12/2002 | Harman | |
| 6,509,926 B1 | 1/2003 | Mills et al. | |
| 6,515,659 B1 | 2/2003 | Kaye et al. | |
| 6,535,233 B1 | 3/2003 | Smith | |
| 6,553,184 B1 | 4/2003 | Ando et al. | |
| 6,590,573 B1 | 7/2003 | Geshwind | |
| 6,606,166 B1 | 8/2003 | Knoll | |
| 6,611,268 B1 | 8/2003 | Szeliski et al. | |
| 6,650,339 B1 | 11/2003 | Silva et al. | |
| 6,662,357 B1 | 12/2003 | Bowman-Amuah | |
| 6,665,798 B1 | 12/2003 | McNally et al. | |
| 6,677,944 B1 | 1/2004 | Yamamoto | |
| 6,686,591 B2 | 2/2004 | Ito et al. | |
| 6,686,926 B1 | 2/2004 | Kaye | |
| 6,707,487 B1 | 3/2004 | Amand et al. | |
| 6,727,938 B1 | 4/2004 | Randall | |
| 6,737,957 B1 | 5/2004 | Petrovic et al. | |
| 6,744,461 B1 | 6/2004 | Wada et al. | |
| 6,765,568 B2 | 7/2004 | Swift et al. | |
| 6,791,542 B2 | 9/2004 | Matusik et al. | |
| 6,798,406 B1 | 9/2004 | Jones et al. | |
| 6,813,602 B2 | 11/2004 | Thyssen | |
| 6,847,737 B1 | 1/2005 | Kouri et al. | |
| 6,850,252 B1 | 2/2005 | Hoffberg | |
| 6,853,383 B2 | 2/2005 | Duquesnois | |
| 6,859,523 B1 | 2/2005 | Jilk et al. | |
| 6,919,892 B1 | 7/2005 | Cheiky et al. | |
| 6,964,009 B2 | 11/2005 | Samaniego et al. | |
| 6,965,379 B2 | 11/2005 | Lee et al. | |
| 6,973,434 B2 | 12/2005 | Miller | |
| 6,985,187 B2 | 1/2006 | Han et al. | |
| 7,000,223 B1 | 2/2006 | Knutson et al. | |
| 7,006,881 B1 | 2/2006 | Hoffberg et al. | |
| 7,027,054 B1 | 4/2006 | Cheiky et al. | |
| 7,032,177 B2 | 4/2006 | Novak et al. | |
| 7,035,451 B2 | 4/2006 | Harman et al. | |
| 7,079,075 B1 | 7/2006 | Connor et al. | |
| 7,098,910 B2 | 8/2006 | Petrovic et al. | |
| 7,102,633 B2 | 9/2006 | Kaye et al. | |
| 7,116,323 B2 | 10/2006 | Kaye et al. | |
| 7,116,324 B2 | 10/2006 | Kaye et al. | |
| 7,117,231 B2 | 10/2006 | Fischer et al. | |
| 7,136,075 B1 | 11/2006 | Hamburg | |
| 7,181,081 B2 | 2/2007 | Sandrew | |
| 7,190,496 B2 | 3/2007 | Klug et al. | |
| 7,254,264 B2 | 8/2007 | Naske et al. | |
| 7,254,265 B2 | 8/2007 | Naske et al. | |
| 7,260,274 B2 | 8/2007 | Sawhney et al. | |
| 7,272,265 B2 | 9/2007 | Kouri et al. | |
| 7,298,094 B2 | 11/2007 | Yui | |
| 7,308,139 B2 | 12/2007 | Wentland et al. | |
| 7,321,374 B2 | 1/2008 | Naske | |
| 7,327,360 B2 | 2/2008 | Petrovic et al. | |
| 7,333,519 B2 | 2/2008 | Sullivan et al. | |
| 7,333,670 B2 | 2/2008 | Sandrew | |
| 7,343,082 B2 | 3/2008 | Cote et al. | |
| 7,461,002 B2 | 12/2008 | Crockett et al. | |
| 7,512,262 B2 | 3/2009 | Criminisi et al. | |
| 7,519,990 B1 | 4/2009 | Xie | |
| 7,532,225 B2 | 5/2009 | Fukushima et al. | |
| 7,538,768 B2 | 5/2009 | Kiyokawa et al. | |
| 7,542,034 B2 | 6/2009 | Spooner et al. | |
| 7,573,475 B2 | 8/2009 | Sullivan et al. | |
| 7,573,489 B2 | 8/2009 | Davidson et al. | |
| 7,576,332 B2 | 8/2009 | Britten | |
| 7,577,312 B2 | 8/2009 | Sandrew | |
| 7,610,155 B2 | 10/2009 | Timmis et al. | |
| 7,624,337 B2 | 11/2009 | Sull et al. | |
| 7,630,533 B2 | 12/2009 | Ruth et al. | |
| 7,663,689 B2 | 2/2010 | Marks | |
| 7,680,653 B2 | 3/2010 | Yeldener | |
| 7,772,532 B2 | 8/2010 | Olsen et al. | |
| 7,894,633 B1 | 2/2011 | Harman | |
| 8,085,339 B2 | 12/2011 | Marks | |
| 8,217,931 B2 | 7/2012 | Lowe et al. | |
| 2001/0025267 A1 | 9/2001 | Janiszewski | |
| 2001/0051913 A1 | 12/2001 | Vashistha et al. | |
| 2002/0001045 A1 | 1/2002 | Ranganath et al. | |
| 2002/0048395 A1 | 4/2002 | Harman et al. | |
| 2002/0049778 A1 | 4/2002 | Bell | |
| 2002/0063780 A1 | 5/2002 | Harman et al. | |
| 2002/0075384 A1 | 6/2002 | Harman | |
| 2003/0018608 A1 | 1/2003 | Rice | |
| 2003/0046656 A1 | 3/2003 | Saxana | |
| 2003/0069777 A1 | 4/2003 | Or-Bach | |
| 2003/0093790 A1 | 5/2003 | Logan et al. | |
| 2003/0097423 A1 | 5/2003 | Ozawa et al. | |
| 2003/0154299 A1 | 8/2003 | Hamilton | |
| 2003/0177024 A1 | 9/2003 | Tsuchida | |
| 2004/0004616 A1 | 1/2004 | Konya et al. | |
| 2004/0062439 A1 | 4/2004 | Cahill et al. | |
| 2004/0181444 A1 | 9/2004 | Sandrew | |
| 2004/0189796 A1 | 9/2004 | Ho et al. | |
| 2004/0258089 A1 | 12/2004 | Derechin et al. | |
| 2005/0088515 A1 | 4/2005 | Geng | |
| 2005/0104878 A1 | 5/2005 | Kaye et al. | |
| 2005/0146521 A1 | 7/2005 | Kaye et al. | |
| 2005/0188297 A1 | 8/2005 | Knight et al. | |
| 2005/0207623 A1 | 9/2005 | Liu et al. | |
| 2005/0231501 A1 | 10/2005 | Nitawaki | |
| 2005/0231505 A1 | 10/2005 | Kaye et al. | |
| 2005/0280643 A1 | 12/2005 | Chen | |
| 2006/0028543 A1 | 2/2006 | Sohn et al. | |
| 2006/0061583 A1 | 3/2006 | Spooner et al. | |
| 2006/0274905 A1 | 12/2006 | Lindahl et al. | |
| 2007/0052807 A1 | 3/2007 | Zhou et al. | |
| 2007/0260634 A1 | 11/2007 | Makela et al. | |
| 2007/0279412 A1 | 12/2007 | Davidson et al. | |
| 2007/0279415 A1 | 12/2007 | Sullivan et al. | |
| 2007/0296721 A1 | 12/2007 | Chang et al. | |
| 2008/0044155 A1 | 2/2008 | Kuspa | |
| 2008/0079851 A1 | 4/2008 | Stanger et al. | |
| 2008/0117233 A1 * | 5/2008 | Mather et al. | 345/690 |
| 2008/0147917 A1 | 6/2008 | Lees et al. | |
| 2008/0162577 A1 | 7/2008 | Fukuda et al. | |
| 2008/0181486 A1 | 7/2008 | Spooner et al. | |
| 2008/0225040 A1 | 9/2008 | Simmons et al. | |
| 2008/0225042 A1 | 9/2008 | Birtwistle et al. | |
| 2008/0225045 A1 | 9/2008 | Birtwistle | |
| 2008/0225059 A1 | 9/2008 | Lowe et al. | |
| 2008/0226123 A1 | 9/2008 | Birtwistle | |
| 2008/0226128 A1 | 9/2008 | Birtwistle et al. | |
| 2008/0226160 A1 | 9/2008 | Birtwistle et al. | |

(56) References Cited

U.S. PATENT DOCUMENTS

| | | | |
|---|---|---|---|
| 2008/0226181 A1 | 9/2008 | Birtwistle et al. |
| 2008/0226194 A1 | 9/2008 | Birtwistle et al. |
| 2008/0227075 A1 | 9/2008 | Poor et al. |
| 2008/0228449 A1 | 9/2008 | Birtwistle et al. |
| 2008/0246759 A1 | 10/2008 | Summers |
| 2008/0246836 A1 | 10/2008 | Lowe et al. |
| 2008/0259073 A1 | 10/2008 | Lowe et al. |
| 2009/0002368 A1 | 1/2009 | Vitikainen et al. |
| 2009/0033741 A1 | 2/2009 | Oh et al. |
| 2009/0116732 A1 | 5/2009 | Zhou et al. |
| 2009/0219383 A1 | 9/2009 | Passmore |
| 2009/0256903 A1 | 10/2009 | Spooner et al. |
| 2009/0303204 A1* | 12/2009 | Nasiri et al. ............... 345/184 |
| 2010/0045666 A1* | 2/2010 | Kornmann et al. ........... 345/419 |
| 2010/0259610 A1 | 10/2010 | Petersen |
| 2011/0050864 A1 | 3/2011 | Bond |
| 2011/0074784 A1 | 3/2011 | Turner |
| 2011/0169827 A1 | 7/2011 | Spooner et al. |
| 2011/0169914 A1 | 7/2011 | Lowe et al. |
| 2011/0188773 A1 | 8/2011 | Wei et al. |
| 2011/0227917 A1 | 9/2011 | Lowe et al. |
| 2011/0273531 A1 | 11/2011 | Ito et al. |
| 2012/0032948 A1 | 2/2012 | Lowe et al. |
| 2012/0087570 A1 | 4/2012 | Seo et al. |
| 2012/0102435 A1 | 4/2012 | Han et al. |
| 2012/0188334 A1 | 7/2012 | Fortin et al. |
| 2012/0274626 A1 | 11/2012 | Hsieh |
| 2012/0281906 A1 | 11/2012 | Appia |
| 2013/0051659 A1 | 2/2013 | Yamamoto |

FOREIGN PATENT DOCUMENTS

| | | |
|---|---|---|
| EP | 1187494 | 3/2002 |
| GB | 2487039 A | 11/2012 |
| JP | 60-52190 | 3/1985 |
| JP | 2003046982 | 2/2003 |
| JP | 2004207985 | 7/2004 |
| KR | 20120095059 | 2/2012 |
| KR | 20130061289 | 11/2013 |
| SU | 1192168 A | 9/1982 |
| WO | 97/24000 | 7/1997 |
| WO | 99/12127 | 3/1999 |
| WO | 99/30280 | 6/1999 |
| WO | 00/79781 | 12/2000 |
| WO | 01/01348 | 1/2001 |
| WO | 02/13143 | 2/2002 |
| WO | 2006/078237 | 7/2006 |
| WO | 2008/075276 | 6/2008 |
| WO | 2011/029209 | 3/2011 |
| WO | 2012016600 | 9/2012 |
| WO | 2013084234 | 6/2013 |

OTHER PUBLICATIONS

Tam et al., "3D-TV Content Generation: 2D-To-3D Conversion", ICME 2006, p. 1868-1872.
Harman et al. "Rapid 2D to 3D Conversion", The Reporter, vol. 17, No. 1, Feb. 2002, 12 pages.
Legend Films, "System and Method for Conversion of Sequences of Two-Dimensional Medical Images to Three-Dimensional Images" Sep. 12, 2013, 7 pages.
McKenna "Interactive Viewpoint Control and Three-Dimensional Operations", Computer Graphics and Animation Group, The Media Laboratory, pp. 53-56, 1992.
International Search Report and Written Opinion issued for PCT/US2013/072447, dated Mar. 13, 2014, 6 pages.
Noll, Computer-Generated Three-Dimensional Movies, Computers and Automation, vol. 14, No. 11 (Nov. 1965), pp. 20-23.
Noll, Stereographic Projections by Digital Computer, Computers and Automation, vol. 14, No. 5 (May 1965), pp. 32-34.
Australian Office Action issued for 2002305387, dated Mar. 15, 2007, 2 page.
Canadian Office Action, Dec. 28, 2011, Appl No. 2,446,150, 4 pages.
Canadian Office Action, Oct. 8, 2010, App. No. 2,446,150, 6 pages.
Canadian Office Action, Jun. 13, 2011, App. No. 2,446,150, 4 pages.
Daniel L. Symmes, Three-Dimensional Image, Microsoft Encarta Online Encyclopedia (hard copy printed May 28, 2008 and of record, now indicated by the website indicated on the document to be discontinued: http://encarta.msn.com/text_761584746_0/Three-Dimensional_Image.html).
Declaration of Barbara Frederiksen in Support of In-Three, Inc's Opposition to Plaintiff's Motion for Preliminary Injunction, Aug. 1, 2005, *IMAX Corporation et al* v. *In-Three, Inc.*, Case No. CV05 1795 FMC (Mcx). (25 pages).
Declaration of John Marchioro, Exhibit C, 3 pages, Nov. 2, 2007.
Declaration of Michael F. Chou, Exhibit B, 12 pages, Nov. 2, 2007.
Declaration of Steven K. Feiner, Exhibit A, 10 pages, Nov. 2, 2007.
Di Zhong, Shih-Fu Chang, "AMOS: An Active System for MPEG-4 Video Object Segmentation," ICIP (2) 8: 647-651, Apr. 1998.
E. N. Mortensen and W. A. Barrett, "Intelligent Scissors for Image Composition," Computer Graphics (SIGGRAPH '95), pp. 191-198, Los Angeles, CA, Aug. 1995.
EPO Office Action issued for EP Appl. No. 02734203.9, dated Sep. 12, 2006, 4 pages.
EPO Office Action issued for EP Appl. No. 02734203.9, dated Oct. 7, 2010, 5 pages.
Eric N. Mortensen, William A. Barrett, "Interactive segmentation with Intelligent Scissors," Graphical Models and Image Processing, v.60 n.5, p. 349-384, Sep. 2002.
Exhibit 1 to Declaration of John Marchioro, Revised translation of portions of Japanese Patent Document No. 60-52190 to Hiromae, 3 pages, Nov. 2, 2007.
Gao et al., Perceptual Motion Tracking from Image Sequences, IEEE, Jan. 2001, pp. 389-392.
Grossman, "Look Ma, No Glasses", Games, Apr. 1992, pp. 12-14.
Hanrahan et al., "Direct WYSIWYG painting and texturing on 3D shapes", Computer Graphics, vol. 24, Issue 4, pp. 215-223. Aug. 1990.
Hua Zhong, et al., "Interactive Tracker—A Semi-automatic Video Object Tracking and Segmentation System," Microsoft Research China, http://research.microsoft.com (Aug. 26, 2003).
Indian Office Action issued for Appl. No. 49/DELNP/2005, dated Apr. 4, 2007, 9 pages.
Interpolation (from Wikipedia encyclopedia, article pp. 1-6) retrieved from Internet URL:http://en.wikipedia.org/wiki/Interpolation on Jun. 5, 2008.
IPER, Mar. 29, 2007, PCT/US2005/014348, 5 pages.
IPER, Oct. 5, 2012, PCT/US2011/058182, 6 pages.
International Search Report, Jun. 13, 2003, PCT/US02/14192, 4 pages.
PCT Search Report issued for PCT/US2011/058182, dated May 10, 2012, 8 pages.
PCT Search Report issued for PCT/US2011/067024, dated Aug. 22, 2012, 10 pages.
Izquierdo et al., Virtual 3D-View Generation from Stereoscopic Video Data, IEEE, Jan. 1998, pp. 1219-1224.
Jul. 21, 2005, Partial Testimony, Expert: Samuel Zhou, Ph.D., 2005 WL 3940225 (C.D.Cal.), 21 pages.
Kaufman, D., "The Big Picture", Apr. 1998, http://www.xenotech.com Apr. 1998, pp. 1-4.
Lenny Lipton, "Foundations of the Stereo-Scopic Cinema, a Study in Depth" With and Appendix on 3D Television, 325 pages, May 1978.
Lenny Lipton, Foundations of the Stereo-Scopic Cinema A Study in Depth, 1982, Van Nostrand Reinhold Company.
Machine translation of JP Patent No. 2004-207985, dated Jul. 22, 2008, 34 pg.
Michael Gleicher, "Image Snapping," SIGGRAPH: 183-190, Jun. 1995.
Murray et al., Active Tracking, IEEE International Conference on Intelligent Robots and Systems, Sep. 1993, pp. 1021-1028.
Ohm et al., An Object-Based System for Stereopscopic Viewpoint Synthesis, IEEE transaction on Circuits and Systems for Video Technology, vol. 7, No. 5, Oct. 1997, pp. 801-811.
Optical Reader (from Wikipedia encyclopedia, article p. 1) retrieved from Internet URL:http://en.wikipedia.org/wiki/Optical_reader on Jun. 5, 2008.

(56) References Cited

OTHER PUBLICATIONS

Selsis et al., Automatic Tracking and 3D Localization of Moving Objects by Active Contour Models, Intelligent Vehicles 95 Symposium, Sep. 1995, pp. 96-100.

Slinker et al., "The Generation and Animation of Random Dot and Random Line Autostereograms", Journal of Imaging Science and Technology, vol. 36, No. 3, pp. 260-267, May 1992.

Nguyen et al., Tracking Nonparameterized Object Contours in Video, IEEE Transactions on Image Processing, vol. 11, No. 9, Sep. 2002, pp. 1081-1091.

*U.S. District Court, C.D. California, IMAX Corporation and Three-Dimensional Media Group, Ltd.*, v. *In-Three, Inc.*, Partial Testimony, Expert: Samuel Zhou, Ph.D., No. CV 05-1795 FMC(Mcx), Jul. 19, 2005, WL 3940223 (C.D.Cal.), 6 pages.

*U.S. District Court, C.D. California, IMAX* v. *In-Three*, No. 05 CV 1795, 2005, Partial Testimony, Expert: David Geshwind, WestLaw 2005, WL 3940224 (C.D.Cal.), 8 pages.

*U.S. District Court, C.D. California, Western Division, IMAX Corporation, and Three-Dimensional Media Group, Ltd.* v. *In-Three, Inc.*, No. CV05 1795 FMC (Mcx). Jul. 18, 2005. Declaration of Barbara Frederiksen in Support of In-Three, Inc.'s Opposition to Plaintiffs' Motion for Preliminary Injunction, 2005 WL 5434580 (C.D.Cal.), 13 pages.

U.S. Patent and Trademark Office, Before the Board of Patent Appeals and Interferences, Ex Parte Three-Dimensional Media Group, Ltd., Appeal 2009-004087, Reexamination Control No. 90/007,578, US Patent No. 4,925,294, Decis200, 88 pages, Jul. 30, 2010.

USPTO, Board of Patent Appeals and Interferences, Decision on Appeal dated Jul. 30, 2010, Ex parte Three-Dimensional Media Group, Ltd., Appeal 2009-004087, Reexamination Control No. 90/007,578, US Patent 4,925,294. (88 pages).

Yasushi Mae, et al., "Object Tracking in Cluttered Background Based on Optical Flow and Edges," Proc. 13th Int. Conf. on Pattern Recognition, vol. 1, pp. 196-200, Apr. 1996.

PCT ISR, Feb. 27, 2007, PCT/US2005/014348, 8 pages.

PCT ISR, Sep. 11, 2007, PCT/US07/62515, 9 pages.

PCT ISR, Nov. 14, 2007, PCT/US07/62515, 24 pages.

PCT IPRP, Jul. 4, 2013, PCT/US2011/067024, 5 pages.

Joseph Weber, et al., "Rigid Body Segmentation and Shape Description from Dense Optical Flow Under Weak Perspective," IEEE Transactions on Pattern Analysis and Machine Intelligence, vol. 19, No. 2, Feb. 1997, pp. 139-143

International Search Report Issued for PCT/US2013/072208, dated Feb. 27, 2014, 6 pages.

"Nintendo DSi Uses Camera Face Tracking to Create 3D Mirages", retrieved from www.Gizmodo.com on Mar. 18, 2013, 3 pages.

\* cited by examiner

TILT-BASED LOOK AROUND EFFECT IMAGE ENHANCEMENT METHOD

BACKGROUND OF THE INVENTION

1. Field of the Invention

One or more embodiments of the invention are related to the image processing. More particularly, but not by way of limitation, one or more embodiments of the invention enable a tilt-based look around effect image enhancement method that enables two-dimensional images to be depth enhanced and displayed for example from a different point of view based on the tilt or orientation, and/or movement of the viewing device itself. Embodiments may further alter or otherwise utilize different parallax maps to apply depth to the image based on the display type, e.g., two-dimensional or stereoscopic display. In addition, embodiments may display information foreign to the image when portions of the image are exposed during the look around effect, including advertisements, game information, hyperlinks or any other data not originally in the image.

2. Description of the Related Art

Depth capable image displays present different image information to be viewed based on the angle at which a viewer is situated with respect to the display. A "look around effect" occurs as the viewer moves to a different position wherein the display provides different image information based on the point of view of the observer.

One format for viewing images is a two-dimensional format, for example that may be viewed on a standard computer monitor. When moving about a two-dimensional display, an observer views the image as a flat, for example an image that is displayed in a plane, and otherwise without depth, although shading and lighting may give the observer a sense of depth for portions of the image. This is not considered a three-dimensional view of an image, but rather only a two-dimensional display. Two-dimensional medical imaging systems are the most common and lowest cost system.

Another format for viewing images is a three-dimensional format, however most three-dimensional imagery is displayed in an encoded format and projected onto a two-dimensional display. This enables three-dimensional viewing for example with anaglyph glasses or polarized glasses. Other displays may provide different information based on the orientation with respect to the display, e.g., autostereoscopic displays that do not require special glasses for viewing. An example of such as display is a lenticular display. Alternatively, two images that are shown alternately to the left and right eyes that may be viewed with shutter glasses. Any display type may be utilized for the look around effect as long as objects or portions thereof appear when viewed from one orientation that are not visible from another orientation. Many types of three-dimensional systems are more expensive than existing two-dimensional imaging systems. All known types of displays capable of observing the look around effect require the observer to move around the display to observe the effect.

What is unknown in the art is a tilt-based look around effect image enhancement method that enables two-dimensional images to be depth enhanced and viewed for example from a different point of view based on the tilt of the viewing device itself. This would enable tablet computers and mobile devices to display the effect with standard two-dimensional display technology. For at least the limitations described above there is a need for a tilt-based look around effect image enhancement method.

BRIEF SUMMARY OF THE INVENTION

One or more embodiments described in the specification are related to a tilt-based look around effect image enhancement method. Thus, embodiments of the invention enable display of a look around effect applied to two-dimensional images to provide a sense of depth and inner image relative movement of near and distant portions of the image based on tilt or orientation, or for example movement in the plane parallel to the display or away from the plane parallel to the display. Although embodiments of the invention may utilize two-dimensional displays, embodiments may also display images on stereoscopic displays, for example for viewing with or without three-dimensional viewing glasses.

One or more embodiments of the method include a tilt-based look around effect image enhancement method that includes obtaining an orientation of a display with respect to a reference frame from an orientation element physically associated with the display. This enables tilting a two-dimensional or stereoscopic display, for example on a tablet or mobile computer, to show motion of foreground objects, and in effect show the image from a different point of view. Embodiments of the method further include obtaining a parallax map associated with an image wherein the parallax map includes at least two different depth values associated with at least two different pixels of the image respectively. The parallax map in at least one embodiment may contain maximum pixel motion values for maximum tilt or orientation or movement, for example based on normalized parallax values. Embodiments of the method also include moving at least one of the at least two pixels in the image to at least one new pixel location based on the orientation of the display with respect to the reference frame and/or based on movement of the display, and based on the parallax map. This enables the "nearest" pixels to move the most in general on the display when the display is tilted or moved for example. In one or more embodiments, the display type, e.g., two-dimensional or stereoscopic display may be utilized to enhance the parallax map in multiple ways depending on how the display is configured currently to display the image. In one or more embodiments, certain types of displays may be configured to display two-dimensional data, or pairs of images or encoded images for viewing with the left and right eye, for example with or without special viewing glasses. Embodiments of the method include displaying the image on the display including the at least one pixel in the image in the at least one new pixel location. The image may thus be viewed from a different point of view.

In one or more embodiments, the obtaining of the orientation of the display with respect to the reference frame includes obtaining an orientation vector from the orientation element. Some electronic devices include an orientation element that for example may provide a three-dimensional vector which indicates the direction relative to the display plane, e.g., normal to the plane in which the displays is situated. In this scenario, embodiments of the invention may determine the reference plane from which movement is related to, so as to calculate the amount of tilt about the horizontal axis, the tilt about the vertical axis, or the X and Y axes respectively. Alternatively, or in combination, embodiments of the invention may also be configured such that the obtaining of the orientation of the display with respect to the reference frame includes obtaining at least one acceleration value or angular value or both from the orientation element. This for example may be the case if the electronic device having the display includes an accelerometer or gyroscope, which are commonly provided in MEMS or Micro-Electro-Mechanical Systems packaging. Some types of electronic devices may utilize an accelerometer to provide an orientation vector as part of an Application Programming Interface. In at least one embodiment, the obtaining of the orientation of the display with respect to the reference frame includes obtaining the orientation with respect to a vector associated with gravity. In this scenario, the initial frame of reference from which to apply the look around effect is the vertical display orientation, or an angular offset thereof for example. In other embodiments, the user may assert an input that is obtained by the electronic device to signify the desired initial frame of reference. This enables the obtaining of the orientation of the display with respect to the reference frame to include obtaining the orientation with respect to an initial reference frame of the display at a particular point in time. One or more embodiments may include modifying the frame of reference over time, for example with a time averaged or time weighted function applied to orientation vector samples. This allows for a new orientation that has been applied to the display to be the starting point for further look around effect movements. This may also be utilized to apply a momentum type effect to the movement so that the image continues to move for a defined amount of time after an orientation change.

One or more embodiments may include normalizing a depth map having depth values for the at least two different pixels of the image to create the parallax map. The parallax map associated with an image for example may be encoded for the amount of pixel movement to apply to a 90 degree or full tilt for example of the display in the X or Y axes or both for example. Although a depth map, for example +10 to −5 may be utilized and calculations may be undertaken to determine a viewpoint and amount of pixel movement, the parallax map encodes on a pixel-by-pixel basis the amount of movement to minimize the processing required on the electronic device. This also lowers processing power requirements and battery requirements as well.

In addition, embodiments of the invention may also include altering values of the parallax map to exaggerate depth values. This may be performed in multiple manners, or for example using a strategy pattern to apply different exaggeration amounts based on the type of the display, e.g., two-dimensional which enjoys advantages for look around effect with higher exaggerations, or stereoscopic which in general provides three-dimensional effect by an of itself to warrant more limited movement nearer objects, e.g., less movement of foreground pixels. For example, one or more embodiments may include altering values of the parallax map to provide to a two-dimensional display to exaggerate depth values, for example based on a squared or cubed or higher power for example to accentuate the effect. One or more embodiments may include altering values of the parallax map to provide to a stereoscopic display to exaggerate depth values, for example as a linear or smaller relative power compared to the two-dimensional exaggerated values since the stereoscopic effect provides an easier to view look around effect for some viewers. Any other functions may be utilized to display images on different display types, and the functions may be dynamically switched when the display type is switched from two-dimensional to three-dimensional viewing or visa versa for example.

Embodiments may include altering values of the parallax map based on a display based on two different functions respectively based on a display output type associated with the display depending on whether the display is currently configured to display two-dimensional images or stereoscopic images. This enables the same image to be viewed with look around effect in different ways and dynamically switching between types with the display type is switched on the device as well.

Embodiments may include obtaining a percentage of full tilt based on the orientation vector with respect to the reference frame and multiplying the percentage of full tilt by the parallax map to obtain a pixel-by-pixel amount of movement to utilize in moving the at least one pixel in the image. The multiply function may be linear or non-linear in that any function or ramp of any shape may also be utilized in the multiply operation to may slight movements more or less visible to a viewer of the display. One or more embodiments may include obtaining a percentage of full tilt based on the orientation vector with respect to the reference frame over time and multiplying the percentage of full tilt by the parallax map to obtain a pixel-by-pixel amount of movement to utilize in moving the at least one pixel in the image over time. This enables the tilt vector to have a momentum like effect of continuing to move in a smoother manner for example between two orientations.

Embodiments of the invention may also include obtaining a percentage of full tilt based on the orientation vector with respect to the reference frame in at least two dimensions orthogonal from each other and parallel to a plane defined by the display. Embodiments may include calculating a movement direction based on the percentage in each of two the directions and also include multiplying the percentage of full tilt by the parallax map in the movement direction to obtain a pixel-by-pixel amount of movement to utilize in moving the at least one pixel in the image. Alternatively, embodiments may include obtaining a percentage of full tilt based on the orientation vector or movement with respect to the reference frame in two dimensions orthogonal from each other and parallel to a plane defined by the display, and based on movement in a third dimension not parallel to the plane defined by the display. Embodiments in this translation scenario may include calculating a movement direction based on the percentage in each of two the directions, multiplying the percentage of full tilt by the parallax map in the movement direction to obtain a pixel-by-pixel amount of movement to utilize in moving the at least one pixel in the image and either translating the image based on the movement with respect to the reference frame in two dimensions or translating the image based on the movement in the third dimension or both translating in the two dimensions and in the third dimension as well.

Embodiments of the invention may also include revealing information foreign to the image and hidden by foreground objects wherein the information includes an advertisement, gaming information such as a game clue or prize, or a hyperlink or any other information that is hidden in the image until the image is viewed from a different point of view based on the tilt, or translation for example.

Embodiments may also include compositing at least two images to form the image. This enables multiple cards or images to be combined into a final output image and otherwise enables multiple separate images to be independently generated and depth augmented and later combined, for example with optional depth normalization between the multiple images.

Embodiments of the invention include displaying the image on a two-dimensional display and/or generating a left eye viewpoint image and a right eye viewpoint image and displaying the left eye viewpoint image and the right eye viewpoint image on a stereoscopic display and/or generating an encoded three-dimensional image and displaying the encoded image for three-dimensional viewing with or without three-dimensional viewing glasses.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein.

DETAILED DESCRIPTION OF THE INVENTION

A tilt-based look around effect image enhancement method will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
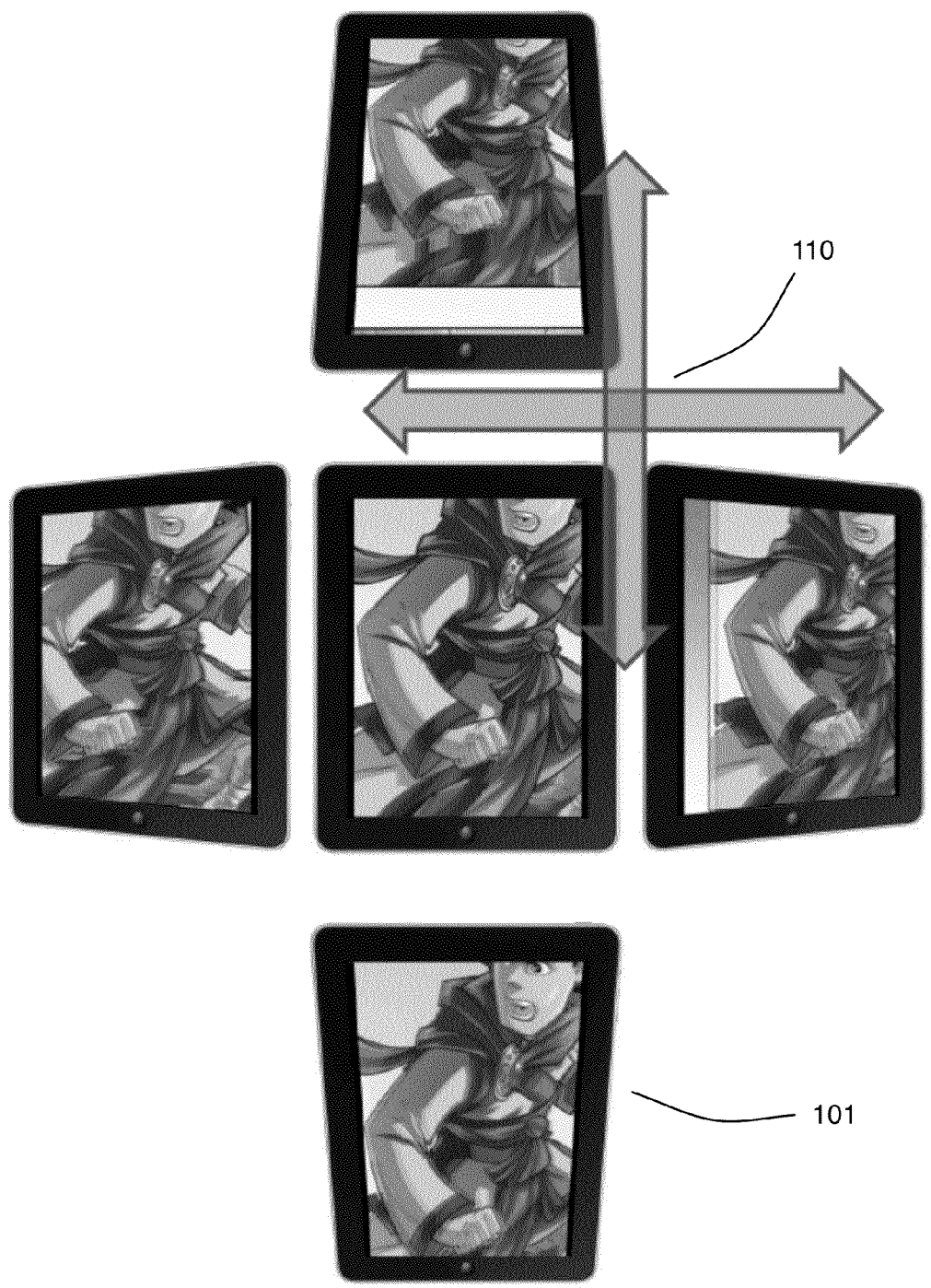
FIG. 1 illustrates an example of an electronic device configured to display a look around effect based on the tilt or orientation of the display, wherein the image is encoded as an anaglyph image to show depth. The images in the displays are intended to be viewed using anaglyph glasses to view the encoded depth and look around effect.

FIG. 1 illustrates an example of an electronic device configured to display a look around effect based on the tilt or orientation of the display, wherein the image is encoded as an anaglyph image to show depth. The images in the displays are intended to be viewed using anaglyph glasses to view the encoded depth and look around effect. As shown, when display 101 of the electronics device is tilted left or right, for example about the vertical or Y axis of X and Y axes 110, the look around effect is applied so that the image is viewed from the right (left image) or from the left (right image). In addition, the look around effect may also be applied to the horizontal axis. For example, when display 101 of the electronics device is tilted up or down, for example about the horizontal or X axis of X and Y axes 110, the look around effect is applied so that the image is viewed from below (top image) or from above (bottom image). Although the image shown is an anaglyph image encoded to provide an example of a stereoscopic encoding that may be utilized on a two-dimensional display to provide different images to the left and right eye, this is not required and the effect may be utilized without glass in a non encoded or standard two-dimensional image. Alternatively, other autostereoscopic displays may be utilized that provide depth as well and which do not require glasses. These types of displays generally provide a left and right image to be viewed by separate eyes of the viewer, e.g., project two different images at two different angles to a user's left and right eyes.

Figure 2:
FIG. 2 illustrates an example of an electronic device configured to display a look around effect based on the tilt or orientation and on movement of the display, to provide for different viewpoints not only about the X and Y axes, but also including translation generally along the Z axis, out of the plane defined by the X and Y axes and including translation for moving the image left/right and up/down along the X and Y axes respectively.

FIG. 2 illustrates an example of an electronic device configured to display a look around effect based on the tilt or orientation and on movement of the display, to provide for different viewpoints not only about the X and Y axes, but also including translation generally along the Z axis, out of the plane defined by the X and Y axes and including translation for moving the image left/right and up/down along the X and Y axes respectively. In one or more embodiments, a scale factor may be applied to any motion obtained from the movement element in the electronic device (see FIG. 6), to translate into an image if the display is moved relative to the reference frame. This may involve translating in (as shown) or out of an image if the display is moved closer (as shown) or further away from the user for example to change the perspective as opposed to zooming which is a 2D effect that generally does not change the perspective. In addition, embodiments of the invention may also detect when movement occurs in the plane of the display, e.g., in the X and Y axes and apply translation to the image (left/right or up/down movement of the image) and apply translation as is shown when the display as positioned further away from the user and oriented slightly down as shown is move toward the user and to the left and tilted up to show the look around and translated image in display 101.

Figure 3:
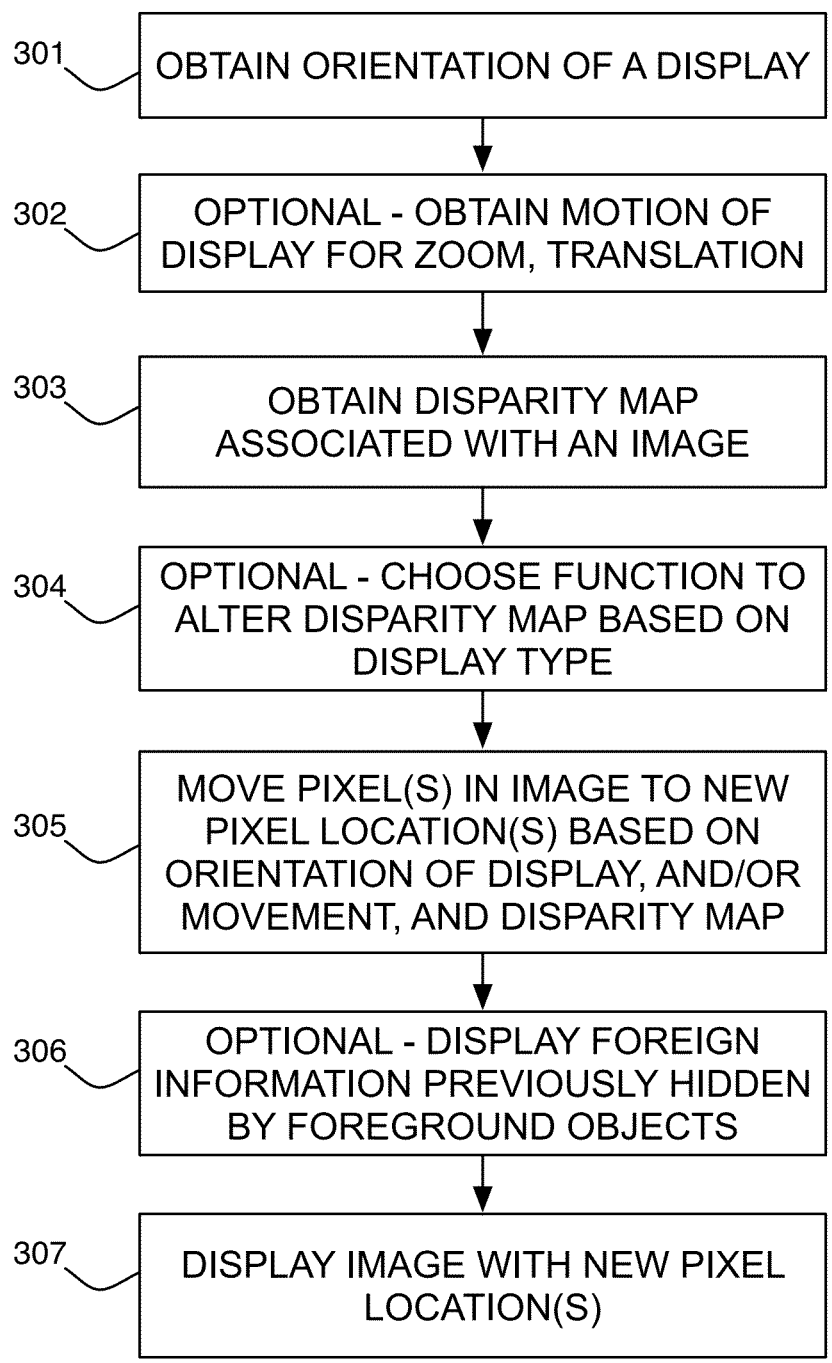
FIG. 3 illustrates an example of a flowchart of an embodiment of the method including obtaining the orientation, parallax map, moving pixels and displaying the image with new pixel locations.

FIG. 3 illustrates an example of a flowchart of an embodiment of the method including obtaining the orientation, parallax map, moving pixels and displaying the image with new pixel locations. Specifically, one or more embodiments of the method include a tilt-based look around effect image enhancement method that includes obtaining an orientation of a display with respect to a reference frame from an orientation element physically associated with the display at 301. This enables tilting a two-dimensional or stereoscopic display, for example on a tablet or mobile computer, to show motion of foreground objects, and in effect show the image from a different point of view. Embodiments of the method may optionally include obtaining motion of the display in the X, Y or Z axes for translation in X and Y axes, and/or translation in or out of Z axis at 302. Embodiments of the method further include obtaining a parallax map associated with an image wherein the parallax map includes at least two different depth values associated with at least two different pixels of the image respectively at 303. The parallax map in at least one embodiment may contain maximum pixel motion values for maximum tilt or orientation or movement, for example based on normalized parallax values. Embodiments may optionally include choosing a function to alter the parallax map based on the display type, for example to exaggerate the look around effect for two-dimensional displays for easier viewing of the effect at 304. Embodiments of the method also include moving at least one of the at least two pixels in the image to at least one new pixel location based on the orientation of the display with respect to the reference frame and/or based on movement of the display, and based on the parallax map at 305. This enables the "nearest" pixels to move the most in general on the display when the display is tilted or moved for example. Optionally, embodiments of the invention may display information that is foreign to the image at 306, for example advertisements, game information, hyperlinks or any other data not originally in the image or any sub-images that make up the image. For example, foreign data is not intended to signify any generated background elements used to fill gaps or other constructed or generated image data used to fill gaps during foreground object movement when encountering missing background data, but rather data that is not found in the image. In one or more embodiments, certain types of displays may be configured to display two-dimensional data, or pairs of images or encoded images for viewing with the left and right eye, for example with or without special viewing glasses. Embodiments of the method include displaying the image on the display including the at least one pixel in the image in the at least one new pixel location at 307. The image may thus be viewed from a different point of view, with in two-dimensional or stereoscopically in three-dimensional type displays.

Figure 4:
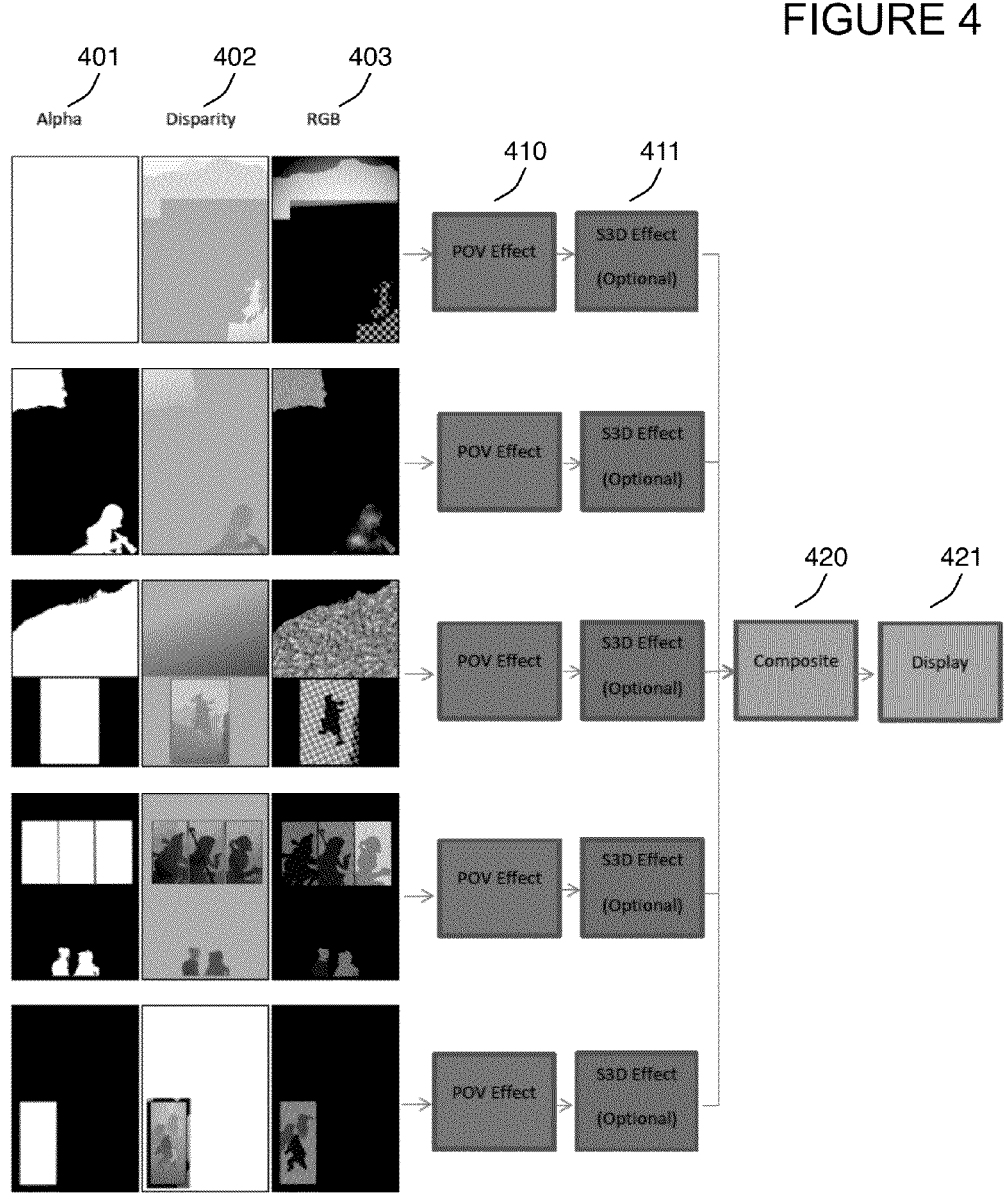
FIG. 4 illustrates a data processing diagram that shows application of parallax for alpha masked portions of input images to create color output sub-images that individually may have the look around effect, otherwise known as the point of view effect applied, along with subsequent stereoscopic effect for stereoscopic display types along with compositing and eventual display of the sub-images as a combined image. Optionally in this scenario, the individual portions of the image may undergo look around effect as opposed to the entire image undergoing a look around effect.

FIG. 4 illustrates a data processing diagram that shows application of parallax for alpha masked portions of input images to create color output sub-images that individually may have the look around effect, otherwise known as the point of view effect applied, along with subsequent stereoscopic effect for stereoscopic display types along with compositing and eventual display of the sub-images as a combined image. Optionally in this scenario, the individual portions of the image may undergo look around effect as opposed to the entire image undergoing a look around effect. Specifically, an alpha mask 401 to be applied to an image to specify where in the input image the processing is to occur, along with the parallax map 402 and input image 403 are input to a respective look around effect, also know as point of view effect or POV processing element 410. This occurs for as many sub-images, which are shown as five sub-images along the vertical portion of the figure. Each of the sub-images may undergo the POV processing and subsequent optional stereoscopic effect processing for three-dimensional display types at 411. The sub-images are combined or otherwise composited at 420 and displayed at 421. See also FIG. 3.

Figure 5:
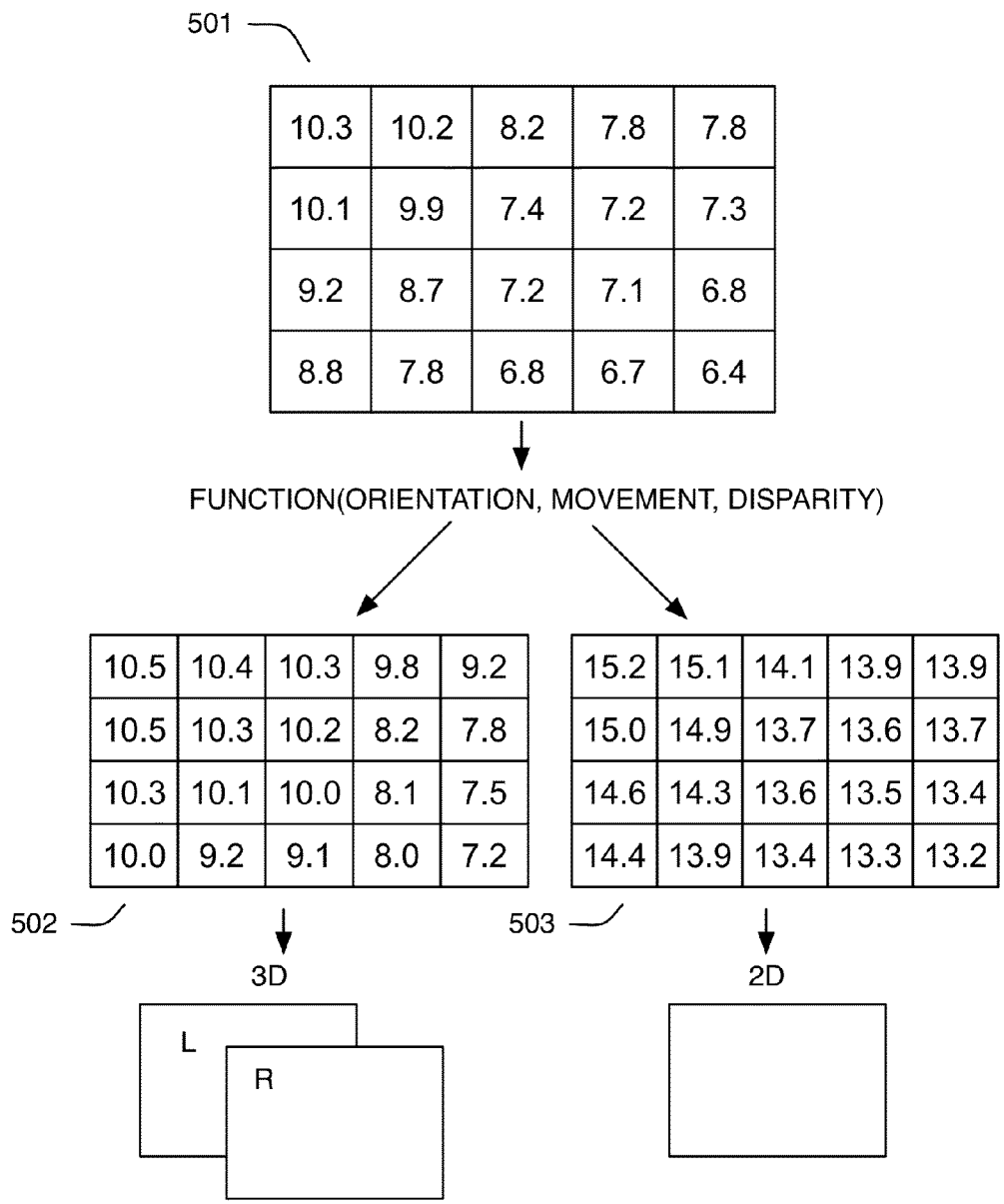
FIG. 5 illustrates a memory view of a parallax map and a function applied thereto to exaggerate the parallax map based on the display type for example.

FIG. 5 illustrates a memory view of a parallax map 501 and a function applied thereto to exaggerate the parallax map based on the display type for example. The parallax map itself may be initially generated based on a depth map for example in any number of ways. For example, in one or more embodiments, the parallax may be obtained from a depth map that for example may contain values of depth with positive and negative numbers or any other number format. In one embodiment the positive numbers may be furthest away and the negative numbers may be closest. Some depth maps may use inverse encodings or any other type of encoding. One or more embodiments may include normalizing a depth map or otherwise normalizing or scaling or altering depth values for the at least two different pixels of the image to create the parallax map. The parallax map 501 associated with an image for example may be encoded for the amount of pixel movement to apply to a 90 degree or full tilt for example of the display in the X or Y axes or both for example. In the example shown at the top of the image, the upper left pixel has a parallax of 10.5 meaning at full tilt the pixel would move 10.5 pixels from the original pixel location in the image. The lower right pixel has a parallax of 7.2 meaning that the pixel would move 7.2 pixels from the original pixel location in the image at full tilt. Although a depth map, for example with depth values between +100 to −50 may be utilized and calculations may be undertaken to determine a viewpoint and amount of pixel movement, the parallax map encodes on a pixel-by-pixel basis the amount of movement to minimize the processing required on the electronic device. This also lowers processing power requirements and battery requirements as well.

In addition, embodiments of the invention may also include altering values of the parallax map to exaggerate depth values. This may be performed in multiple manners, or for example using a strategy pattern to apply different exaggeration amounts based on the type of the display, e.g., two-dimensional which enjoys advantages for look around effect with higher exaggerations, or stereoscopic which in general provides enough three-dimensional effect by an of itself to warrant more limited movement nearer objects, e.g., less movement of foreground pixels. For example, one or more embodiments may include altering values of the parallax map 501 to provide parallax map 503 for use with a two-dimensional display to exaggerate depth values using an equation such as $$zz=((h-g)*(1-\text{power}((1-z)/(1-h/(h-g)),1/0.3)))+g$$

wherein g=minimum depth value associated with an input depth map associated with the image, h=maximum depth value associated with the input depth map associated with the image, z=input parallax map value, and zz=output parallax map value.

One or more embodiments may include altering values of the parallax map 501 to provide parallax map 502 for use with a stereoscopic display to exaggerate depth values using an equation such as $$zz=((h-g)*z)+g$$

These exemplary equations may be utilized but are not intended to be limiting as other functions with more or less exaggeration may be utilized to provide the amount of look around effect desired for the particular display type or application as one skilled in the art will recognize.

Embodiments may include altering values of the parallax map based on a display based on two different functions respectively based on a display output type associated with the display depending on whether the display is currently configured to display two-dimensional images or stereoscopic images. This enables the same image to be viewed with look around effect in different ways and dynamically switching between types with the display type is switched on the device as well.

Figure 6:
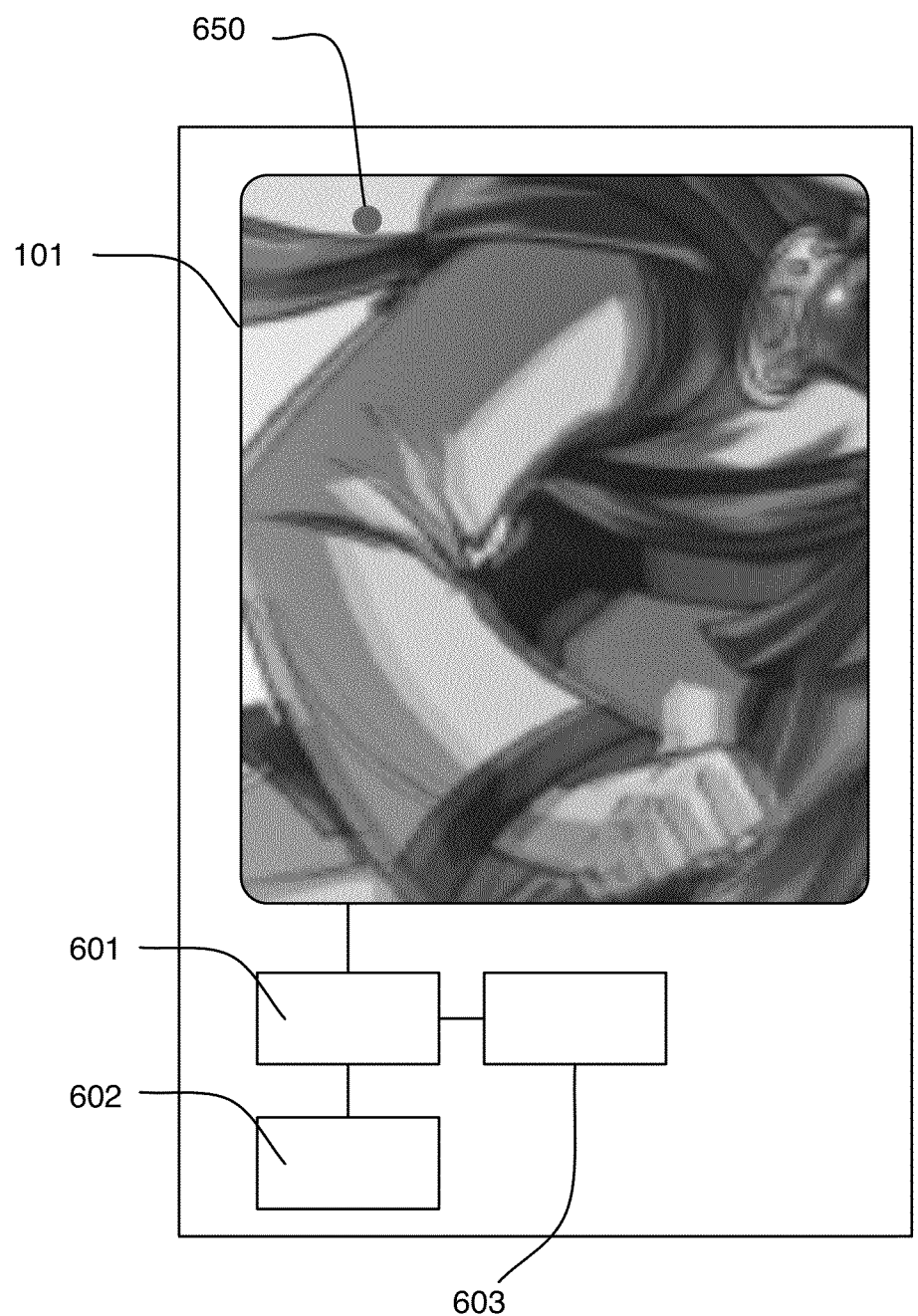
FIG. 6 illustrates a logical view of the electronic device having the display, processor, orientation and/or movement element and memory, along with foreign information that is not in any portion of any sub-image, but which is foreign to the image and shown when portions of the image are exposed during the look around effect. The foreign information may include advertisements, game information, hyperlinks or any other data not originally in the image or any sub-images that make up the image, including any generated background elements used to fill gaps during foreground object movement when encountering missing background data.

FIG. 6 illustrates a logical view of the electronic device having the display 101, processor 601, orientation and/or movement element 602 and memory 603, along with foreign information 650 that is not in any portion of any sub-image, but which is foreign to the image and shown when portions of the image are exposed during the look around effect. The foreign information may include advertisements, game information, hyperlinks or any other data not originally in the image or any sub-images that make up the image, including any generated background elements used to fill gaps during foreground object movement when encountering missing background data.

In one or more embodiments, the obtaining of the orientation of the display with respect to the reference frame includes obtaining an orientation vector from the orientation element 602, for example via processor 601. Some electronic devices include an orientation element that for example may provide a three-dimensional vector which indicates the direction relative to the display plane, e.g., normal to the plane in which the displays is situated. In this scenario, embodiments of the invention may determine the reference plane from which movement is related to, so as to calculate the amount of tilt about the horizontal axis, the tilt about the vertical axis, or the X and Y axes respectively. Alternatively, or in combination, embodiments of the invention may also be configured such that the obtaining of the orientation of the display with respect to the reference frame includes obtaining at least one acceleration value or angular value or both from the orientation element 602. This for example may be the case if the electronic device having the display includes an accelerometer or gyroscope, which are commonly provided in MEMS or Micro-Electro-Mechanical Systems packaging. Some types of electronic devices may utilize an accelerometer to provide an orientation vector as part of an Application Programming Interface. In at least one embodiment, the obtaining of the orientation of the display with respect to the reference frame includes obtaining the orientation with respect to a vector associated with gravity, for example vertically down or orthogonal to the plane of the horizon. In this scenario, the initial frame of reference from which to apply the look around effect is the vertical display orientation, or an angular offset thereof for example 15 degrees tilted back at a normal viewing angle. In other embodiments, the user may assert an input that is obtained by the electronic device to signify the desired initial frame of reference. This enables the obtaining of the orientation of the display with respect to the reference frame to include obtaining the orientation with respect to an initial reference frame of the display at a particular point in time, for example after touching the screen or on application startup, etc. One or more embodiments may include modifying the frame of reference over time, for example with a time averaged or time weighted function applied to orientation vector samples. This allows for a new orientation that has been applied to the display to be the starting point for further look around effect movements. This may also be utilized to apply a momentum type effect to the movement so that the image continues to move for a defined amount of time after an orientation change. In one or more embodiments the average may be utilized such as the sum of orientation vectors divided by the number of orientation vectors to determine the averaged orientation vector. Any other function may be utilized to weight the more recent vectors more or less heavily for example to provide different effects, including overshoot.

Embodiments may include obtaining a percentage of full tilt based on the orientation vector with respect to the reference frame and multiplying the percentage of full tilt by the parallax map to obtain a pixel-by-pixel amount of movement to utilize in moving the at least one pixel in the image. The multiply function may be linear or non-linear in that any function or ramp of any shape may also be utilized in the multiply operation to may slight movements more or less visible to a viewer of the display. One or more embodiments may include obtaining a percentage of full tilt based on the orientation vector with respect to the reference frame over time and multiplying the percentage of full tilt by the parallax map to obtain a pixel-by-pixel amount of movement to utilize in moving the at least one pixel in the image over time. This enables the tilt vector to have a momentum like effect of continuing to move in a smoother manner for example between two orientations. For example as shown in the top portion of FIG. 1, if the display is tilted 10 degrees back then in one or more embodiments, the parallax map values are multiplied by 10/90 and moved by that amount in the positive Y direction.

Embodiments of the invention may also include obtaining a percentage of full tilt based on the orientation vector with respect to the reference frame in at least two dimensions orthogonal from each other and parallel to a plane defined by the display. Embodiments may include calculating a movement direction based on the percentage in each of two the directions and also include multiplying the percentage of full tilt by the parallax map in the movement direction to obtain a pixel-by-pixel amount of movement to utilize in moving the at least one pixel in the image. Alternatively, embodiments may include obtaining a percentage of full tilt based on the orientation vector or movement with respect to the reference frame in two dimensions orthogonal from each other and parallel to a plane defined by the display, and based on movement in a third dimension not parallel to the plane defined by the display. Embodiments in this translation scenario may include calculating a movement direction based on the percentage in each of two the directions, multiplying the percentage of full tilt by the parallax map in the movement direction to obtain a pixel-by-pixel amount of movement to utilize in moving the at least one pixel in the image and either translating the image based on the movement with respect to the reference frame in two dimensions or translating the image based on the movement in the third dimension or both translating the image in two dimensions and also the third dimension. For example, if the display is moved 1 foot closer to the user, and the translation factor is normalized to 2 feet, then the image may be translated by the maximum factor multiplied by ½. The entire image is then scaled by this amount and displayed for example as shown in FIGS. 2 and 6. Translation to the left/right or up/down may also be scaled to a range of normalized movement by moving pixels left/right or up/down based on the amount of movement detected along the X and Y axes. In one or more embodiments, the apparatus may include accepting an input on the display wherein the display is a touch display and wherein the input translates the image in a third dimension not parallel to the plane defined by the display when two finger inputs are pinched toward one another or separated from one another.

Embodiments of the invention may also include revealing information foreign to the image such as foreign information 650 and hidden by foreground objects wherein the information includes an advertisement, gaming information such as a game clue or prize, or a hyperlink or any other information that is hidden in the image until the image is viewed from a different point of view based on the tilt, or translation for example. This enables enhanced advertisement, gaming and reading for example and provides opportunities for businesses to capitalize on enhanced look around features for, but not limited to marketing, gaming and publication related businesses.

Embodiments may also include compositing at least two images to form the image. This enables multiple cards or sub-images to be combined into a final output image and otherwise enables multiple separate images to be independently generated and depth augmented and later combined, for example with optional depth normalization between the multiple images. As shown in FIG. 4, the sub-images may be provided and displayed on any type of display with the look around effect.

Embodiments of the invention include displaying the image on a two-dimensional display (see FIG. 5 bottom right) and/or generating a left eye viewpoint image and a right eye viewpoint image and displaying the left eye viewpoint image and the right eye viewpoint image on a stereoscopic display (see FIG. 5 bottom left) and/or generating an encoded three-dimensional image and displaying the encoded image for three-dimensional viewing with or without three-dimensional viewing glasses.

While the invention herein disclosed has been described by means of specific embodiments and applications thereof, numerous modifications and variations could be made thereto by those skilled in the art without departing from the scope of the invention set forth in the claims.

What is claimed is:

1. A tilt-based look around effect image enhancement method comprising:
   obtaining an orientation of a display with respect to a reference frame from an orientation element physically associated with the display;
   obtaining a parallax map associated with an image wherein the parallax map comprises at least two different depth values associated with at least two different pixels of the image respectively;
   moving at least one of the at least two pixels in the image to at least one new pixel location based on the orientation of the display with respect to the reference frame and based on the parallax map;
   displaying the image on the display including the at least one pixel in the image in the at least one new pixel location; and
   one or more of
   altering values of the parallax map to provide to a two-dimensional display to exaggerate depth values using an equation comprising $zz=((h-g)*(1-\text{power}((1-z)/(1-h/(h-g)),1/0.3))+g;$ and,
   altering values of the parallax map to provide to a stereoscopic display to exaggerate depth values using an equation comprising $zz=((h-g)*z)+g;$ wherein
   g=minimum depth value associated with an input depth map associated with the image,
   h=maximum depth value associated with the input depth map associated with the image,
   z=input parallax map value, and
   zz=output parallax map value.

2. The method of claim 1 further comprising:
   wherein the obtaining of the orientation of the display with respect to the reference frame comprises obtaining an orientation vector from the orientation element.

3. The method of claim 1 further comprising:
   wherein the obtaining of the orientation of the display with respect to the reference frame comprises obtaining at least one acceleration value or angular value or both from the orientation element.

4. The method of claim 1 further comprising:
   wherein the obtaining of the orientation of the display with respect to the reference frame comprises obtaining the orientation with respect to a vector associated with gravity.

5. The method of claim 1 further comprising:
   wherein the obtaining of the orientation of the display with respect to the reference frame comprises obtaining the orientation with respect to an initial reference frame of the display at a particular point in time.

6. The method of claim 1 further comprising:
   modifying the frame of reference over time.

7. The method of claim 1 further comprising:
   normalizing a depth map having depth values for the at least two different pixels of the image to create the parallax map.

8. The method of claim 1 further comprising:
   altering values of the parallax map to exaggerate depth values.

9. The method of claim 1 further comprising:
   altering values of the parallax map based on said display to provide said two-dimensional display or said stereoscopic display based on a display output type associated with the display depending on whether the display is currently configured to display two-dimensional images or stereoscopic images.

10. The method of claim 1 further comprising:
    obtaining a percentage of full tilt based on the orientation vector with respect to the reference frame;
    multiplying the percentage of full tilt by the parallax map to obtain a pixel-by-pixel amount of movement to utilize in moving the at least one pixel in the image.

11. The method of claim 1 further comprising:
    obtaining a percentage of full tilt based on the orientation vector with respect to the reference frame over time;
    multiplying the percentage of full tilt by the parallax map to obtain a pixel-by-pixel amount of movement to utilize in moving the at least one pixel in the image over time.

12. The method of claim 1 further comprising:
    obtaining a percentage of full tilt based on the orientation vector with respect to the reference frame in at least two dimensions orthogonal from each other and parallel to a plane defined by the display;
    calculating a movement direction based on the percentage in each of two the directions;
    multiplying the percentage of full tilt by the parallax map in the movement direction to obtain a pixel-by-pixel amount of movement to utilize in moving the at least one pixel in the image.

13. The method of claim 1 further comprising:
    obtaining a percentage of full tilt based on the orientation vector or movement with respect to the reference frame in two dimensions orthogonal from each other and parallel to a plane defined by the display and based on movement in a third dimension not parallel to the plane defined by the display;
    calculating a movement direction based on the percentage in each of two the directions;
    multiplying the percentage of full tilt by the parallax map in the movement direction to obtain a pixel-by-pixel amount of movement to utilize in moving the at least one pixel in the image; and, translating the image based on the movement with respect to the reference frame in two dimensions
or
translating the image based on the movement in the third dimension
or
both translating the image in the two dimensions and in the third dimension.

14. The method of claim 1 further comprising:
accepting an input on the display wherein the display is a touch display and wherein the input translates the image in a third dimension not parallel to the plane defined by the display when two finger inputs are pinched toward one another or separated from one another.

15. The method of claim 1 further comprising:
revealing information foreign to the image and hidden by foreground objects wherein the information includes an advertisement or game clue.

16. The method of claim 1 further comprising:
revealing information foreign to the image and hidden by foreground objects wherein the information includes a hyperlink.

17. The method of claim 1 further comprising:
compositing at least two images to form the image.

18. The method of claim 1 wherein the displaying the image comprises displaying the image on a two-dimensional display.

19. The method of claim 1 further comprising:
generating a left eye viewpoint image and a right eye viewpoint image and wherein the displaying the image comprises displaying the left eye viewpoint image and the right eye viewpoint image on a stereoscopic display.

20. The method of claim 1 further comprising:
generating an encoded three-dimensional image wherein the displaying the image comprises displaying the encoded image for three-dimensional viewing with or without three-dimensional viewing glasses.

21. A tilt-based look around effect image enhancement method comprising:
obtaining an orientation of a display with respect to a reference frame from an orientation element physically associated with the display;
obtaining a parallax map associated with an image wherein the parallax map comprises at least two different depth values associated with at least two different pixels of the image respectively;
moving at least one of the at least two pixels in the image to at least one new pixel location based on the orientation of the display with respect to the reference frame and based on the parallax map;
displaying the image on the display including the at least one pixel in the image in the at least one new pixel location; and,
altering values of the parallax map to provide to a two-dimensional display to exaggerate depth values using an equation comprising $$zz=((h-g)*(1-\text{power}((1-z)/(1-h/(h-g)),1/0.3)))+g;$$

wherein
$g$=minimum depth value associated with an input depth map associated with the image,
$h$=maximum depth value associated with the input depth map associated with the image,
$z$=input parallax map value, and
$zz$=output parallax map value.

22. A tilt-based look around effect image enhancement method comprising:
obtaining an orientation of a display with respect to a reference frame from an orientation element physically associated with the display;
obtaining a parallax map associated with an image wherein the parallax map comprises at least two different depth values associated with at least two different pixels of the image respectively;
moving at least one of the at least two pixels in the image to at least one new pixel location based on the orientation of the display with respect to the reference frame and based on the parallax map;
displaying the image on the display including the at least one pixel in the image in the at least one new pixel location; and,
altering values of the parallax map to provide to a stereoscopic display to exaggerate depth values using an equation comprising $$zz=((h-g)*z)+g;$$

wherein
$g$=minimum depth value associated with an input depth map associated with the image,
$h$=maximum depth value associated with the input depth map associated with the image,
$z$=input parallax map value, and
$zz$=output parallax map value.

* * * * *